United States Patent [19]

Moore et al.

[11] 4,384,026
[45] May 17, 1983

[54] PHOTOCURABLE ACRYLIC COATED POLYCARBONATE ARTICLES

[75] Inventors: James E. Moore, Clifton Park; Ona V. Orkin; Siegfried H. Schroeter, both of Schenectady, all of N.Y.

[73] Assignee: General Electric Company, Pittsfield, Mass.

[21] Appl. No.: 368,579

[22] Filed: Apr. 15, 1982

Related U.S. Application Data

[63] Continuation of Ser. No. 956,882, Nov. 1, 1978, abandoned.

[51] Int. Cl.³ .............................................. B05D 3/06
[52] U.S. Cl. .................................. 428/412; 427/54.1
[58] Field of Search ............... 427/54.1, 44, 162, 163, 427/164; 428/412

[56] References Cited

U.S. PATENT DOCUMENTS

| | | | |
|---|---|---|---|
| 3,465,076 | 9/1969 | Asami et al. | 264/255 |
| 3,518,341 | 6/1970 | Haryu | 428/411 |
| 3,582,398 | 6/1971 | Ringler | 428/412 |
| 3,843,390 | 10/1974 | Hudson et al. | 428/412 |
| 3,968,305 | 7/1976 | Oshima | 428/412 |
| 3,968,309 | 7/1976 | Matsuo | 428/409 |
| 3,978,178 | 8/1976 | Oshima | 264/25 |
| 4,018,939 | 4/1977 | Merrill | 427/54.1 |
| 4,041,120 | 8/1977 | Oshima | 264/171 |
| 4,103,065 | 7/1978 | Gagnon | 428/412 |
| 4,129,667 | 12/1978 | Lorenz et al. | 427/54.1 |

*Primary Examiner*—John H. Newsome
*Attorney, Agent, or Firm*—William F. Mufatti

[57] ABSTRACT

A polycarbonate article having an adherent mar, abrasion and chemical resistant ultraviolet light cured coating on the surface thereof comprised of the photoreaction products of certain polyfunctional acrylate monomers and certain acrylate modified polymers.

7 Claims, No Drawings

PHOTOCURABLE ACRYLIC COATED POLYCARBONATE ARTICLES

This is a continuation, of application Ser. No. 956,882, filed Nov. 1, 1978 now abandoned.

This invention relates to polycarbonate articles coated with a photocured coating comprised of the reaction product of certain multifunctional acrylate ester monomers and certain acrylate modified polymers.

More particularly, this invention relates to a polycarbonate article having a photocured coating thereon which coating is clear, mar, abrasion, and solvent resistant, has good adhesion to the polycarbonate substrate, and is compatible with the polycarbonate; i.e., does not adversely affect the polycarbonate substrate by stress cracking and crazing it, by causing crack propagation into the polycarbonate as a result of brittleness of the coating itself and/or by adversely affecting the properties of the polycarbonate generally such as, for example, impact resistance, elongation, and tensile strength.

BACKGROUND OF THE INVENTION

Polycarbonates are commercially important materials possessing excellent physical and chemical properties which are useful in a wide range application from non-opaque impact resistant sheets to shaped articles. Generally, however, polycarbonates have rather low scratch resistance and are somewhat susceptible to attack by many common solvents and chemicals.

Previous efforts to overcome this low scratch resistance and susceptibility to attack by solvents have included lamination procedures and application onto the polycarbonate of a surface coating. Many of these prior art remedial efforts have been unsuccessful due to the incompatibility of the laminae and coating materials with the polycarbonate substrate. This incompatibility has resulted in stress cracking and crazing of the polycarbonate, crack propagation into the polycarbonate as a result of the brittleness of the coating, and a reduction of the advantageous properties of the polycarbonate such as, for example, impact resistance, tensile strength, non-opacity and elongation.

The prior art coatings for polycarbonates have included organopolysiloxaner, U.S. Pat. No. 3,707,397; polyester-melamines or acrylic-melamines, U.S. Pat. No. 3,843,390; and allyl resins, U.S. Pat. No. 2,332,461. These types of prior art coatings are generally applied from solutions of inert solvents and are cured to final properties by baking at elevated temperatures. The disadvantages of such systems are obvious. The heat curing requires a supply of thermal energy thereby adding to the cost of the system. Further, the thermal curing step is somewhat limited by the heat distortion temperature of the polycarbonate which is to be coated. Thus, in coating of polycarbonates, sheets of 30 mils and less generally cannot be coated and cured economically because of excessive warpage of the sheets during the thermal curing process.

It is also known in the art to impart abrasion resistance to the surface of a synthetic resin article by forming on the surface of said article a cured film containing, inter alia, a mixture of a compound having a total of at least three acryloxy and/or methacryloxy groups and a copolymerizable mono- or diethylenically unsaturated compound. Thus, for example, U.S. Pat. No. 3,968,305 describes a synthetic resin shaped article having a mar-resistant polymer surface layer consisting essentially of, in polymerized form, (a) 20 to 100 weight % of a compound having a total of at least three acryloxy and/or methacryloxy groups linked with a straight chain aliphatic hydrocarbon residue having not more than 20 carbon atoms and (b) 0 to 80 weight % of at least one copolymerizable mono- or diethylenically unsaturated compound. U.S. Pat. No. 3,968,309 describes a molded article of plastic having on its surface a cured film of a coating material comprising at least 30% by weight of at least one polyfunctional compound selected from the group consisting of polymethacryloxy compounds having at least three methacryloyloxy groups in one molecule and a molecular weight of 250 to 800 and polyacryloxy compounds having at least three acryloyloxy groups in one molecule and a molecular weight of 250 to 800, and a fluorine-containing surfactant, in which the fluorine atom is bonded to a carbon atom.

It has now been found that certain specific polyfunctional acrylic monomers in conjunction with certain acrylic modified polymers can be used to provide excellent UV cured coatings for polycarbonate. Thus, the present invention provides a certain acrylate ester monomer-acrylic modified polymer based UV-cured non-opaque coating for polycarbonates which has improved adhesion, especially after exposure to weathering, to the polycarbonate, is compatible with the polycarbonate, and is mar, abrasion and solvent resistant.

DESCRIPTION OF THE INVENTION

In accordance with the present invention, there is provided a non-opaque, more particularly a transparent, polycarbonate article having deposited on the surface thereof, mar, abrasion, and chemical resistant non-opaque coating having improved adhesion to the polycarbonate substrate, said coating comprising a UV-cured composition containing the photoreaction products of certain UV curable polyfunctional acrylic monomers and certain UV-curable acrylic modified polymers.

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A (2,2-bis(4-hydroxyphenyl) propane), bis(4-hydroxyphenyl)methane, 2,2-bis(4-hydroxy-3-methylphenyl) propane, 3,3-bis(4-hydroxyphenyl)pentane, 2,2-bis(3,5-dichloro-4-hydroxyphenyl)-propane, 2,2-bis(4-3,5-dibromo-4-hydroxyphenyl) propane, bis(3-chloro-4-hydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester of a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, para-tertiary-butyl-phenol, para-bromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-hyptyl-ammonium iodide, tetra-n-propyl ammonium bromide, tetramethyl ammonium chloride, tetramethyl ammonium hydroxide, tetra-n-butyl-ammonium iodide, benzyltrimethylammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also included herein are blends of a linear polycarbonate and a branched polycarbonate.

The first component of the UV curable coating compositions of the present invention is a polyfunctional acrylate ester monomer.

The polyfunctional acrylate ester monomers of the present invention are represented by the general formula

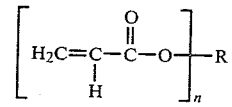

I.

wherein n is an integer from 2 to 8, preferably from 2 to 6, and more preferably from 2 to 4; and R is a n functional hydrocarbon residue, a n functional substituted hydrocarbon residue, a n functional hydrocarbon residue containing at least one ether linkage, and a n functional substituted hydrocarbon residue containing at least one ether linkage.

Preferred n functional hydrocarbon residues are the n functional aliphatic, preferably saturated aliphatic, hydrocarbon residues containing from 1 to about 20 carbon atoms and the n functional aromatic hydrocarbon residues containing from 6 to about 10 carbon atoms.

Preferred n functional hydrocarbon residues containing at least one ether linkage are the n functional aliphatic hydrocarbon residues, preferably saturated aliphatic hydrocarbon residues, containing from 1 to about 5 ether linkages and from 2 to about 20 carbon atoms.

Preferred n functional substituted hydrocarbon residues are the n functional aliphatic hydrocarbon residues, preferably the saturated aliphatic hydrocarbon residues, containing from 1 to about 20 carbon atoms, and the n functional aromatic hydrocarbon residues containing from 6 to about 10 carbon atoms which contain substituent groups such as the halogens, i.e., fluorine, chlorine, bromine and iodine, hydroxyl, —COOH, and —COOR' groups wherein R' represents alkyl groups containing from 1 to about 6 carbon atoms.

Preferred n functional substituted hydrocarbon residues containing at least one ether linkage are the n functional aliphatic, preferably saturated aliphatic, hydrocarbon residues containing from 2 to about 20 carbon atoms and from 1 to about 5 ether linkages which contain substituent groups such as the halogen hydroxyl, —COOH, and —COOR' groups wherein R' is as defined above.

It is to be understood that where substituent groups are present, they should be such that they do not unduly hinder or interfere with the photocure of the polyfunctional acrylic monomers.

The more preferred polyfunctional acrylic monomers are those represented by formula I wherein R is selected from the group consisting of an n functional saturated aliphatic hydrocarbon residue containing from 1 to about 20 carbon atoms, a hydroxyl substituted n functional saturated aliphatic hydrocarbon residue containing from 1 to about 20 carbon atoms, an n functional saturated aliphatic hydrocarbon residue containing from 2 to about 20 carbon atoms and from 1 to about 5 ether linkages, and a hydroxyl substituted n functional saturated aliphatic hydrocarbon residue containing from 2 to about 20 carbon atoms and from 1 to about 5 ether linkages.

The preferred polyfunctional acrylate ester monomers are those wherein R is an n functional saturated aliphatic hydrocarbon, ether, or polyether radical, with those monomers wherein R is an n valent saturated aliphatic hydrocarbon radical being more preferred.

More particularly, the difunctional acrylic monomers, or diacrylates, are represented by formula I wherein n is 2; the trifunctional acrylic monomers, or triacrylates, are represented by formula I wherein n is 3; and the tetra-functional acrylic monomers, or tetraacrylates, are represented by formula I wherein n is 4.

More particularly, the difunctional acrylic monomers, or diacrylates, are represented by formula I wherein n is 2; the trifunctional acrylic monomers, or triacrylates, are represented by formula I wherein n is 3; and the tetra-functional acrylic monomers, or tetraacrylates, are represented by formula I wherein n is 4.

Illustrative of suitable polyfunctional acrylate ester monomers of formula I are those listed below in TABLE I.

TABLE I

Diacrylates of Formula I

1. $CH_2=CHCOO-CH_2-OOCCH=CH_2$
2. $CH_2=CHCOO-CH_2-CH_2-OOCCH=CH_2$
3. $CH_2=CHCOO-CH_2-CHOHCH_2-OOCCH=CH_2$
4. $CH_2=CHCOO-(CH_2)_6-OOCCH=CH_2$

5. $CH_2=CHCOO-CH_2-CH_2-\underset{\underset{OOCCH=CH_2}{|}}{CH}-CH_3$

6. $CH_2=CHCOO-CH_2CH_2OCH_2CH_2-OOCCH=CH_2$
7. $CH_2=CHCOO-CH_2CH_2OCH_2CH_2OCH_2CH_2OCH_2CH_2-OOCCH=CH_2$

8. $CH_2=CHCOO-CH_2-\underset{\underset{CH_3}{|}}{\overset{\overset{CH_3}{|}}{C}}-OOCCH=CH_2$ 9. $CH_2=CHCOO-CH_2-\underset{\underset{CH_3}{|}}{\overset{\overset{CH_2Br}{|}}{C}}-OOCCH=CH_2$ 10. $CH_2=CHCOO-CH_2-\underset{\underset{CH_3}{|}}{\overset{\overset{CH_2OH}{|}}{C}}-OOCCH=CH_2$ 11. $CH_2=CHCOO-CH_2-\underset{\underset{CH_2OH}{|}}{\overset{\overset{CH_2OH}{|}}{C}}-OOCCH=CH_2$ 12. $CH_2=CHCOO-CH_2-\underset{\underset{CH_2Br}{|}}{\overset{\overset{CH_2OH}{|}}{C}}-OOCCH=CH_2$

13. $CH_2=CHCOO-CH_2-CH=CH-CH_2-CH_3-OOCCH=CH_2$

14. $CH_2=CHCOO-CH_2-CH=CH-\underset{\underset{CH_2OH}{|}}{CH}-OOCCH=CH_2$

15. $CH_2=CHCOO-CH_2-\underset{\underset{CH_2Cl}{|}}{\overset{\overset{CH_2OH}{|}}{C}}-CH_2OOCCH=CH_2$ 16. $CH_2=CHCOO-CH_2-\underset{\underset{}{|}}{\overset{\overset{OCH_3}{|}}{CH_2}}-CH_2-OOCCH=CH_2$ 17. $CH_2=CHCOO-\underset{}{\bigcirc}-OOCCH=CH_2$ 18. $CH_2=CHCOO-\overset{\overset{CH_3}{\diagup}}{\bigcirc}-OOCCH=CH_2$

TABLE I-continued

19. 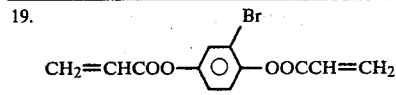

20. 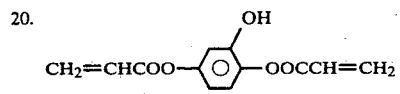

21. 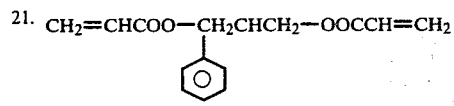

Triacrylates of Formula I

22. 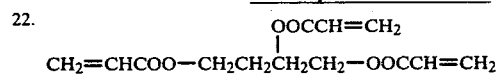

23. 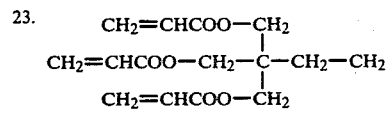

24. 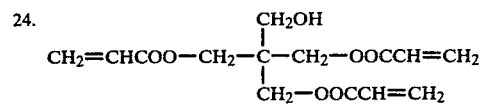

25. 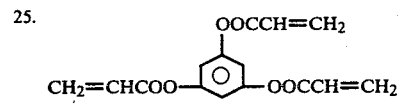

Tetraacrylates of Formula I

26. 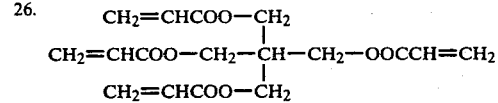

27. 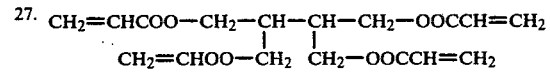

28. 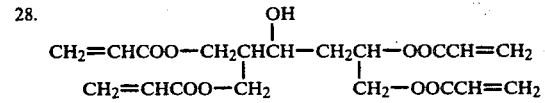

These polyacrylate esters and their production are well known to those skilled in the art. One method of producing the di-, tri-, and tetraacrylate esters involves reacting acrylic acid with a di-, tri-, or tetrahydroxyl compound to produce the diester, triester or tetraester. Thus, for example, acrylic acid can be reacted with ethylene glycol to produce ethylene glycol diacrylate (compound 2 in Table I).

The second component of the coating compositions of the present invention is an acrylate modified polymeric resin. The acrylate modified polymeric resins are conventional polymer types whose structure and preparation are known in the art. These acrylate modified polymers have UV reactive acrylate groups incorporated into the polymer. Generally, these acrylate modified polymers have the general structure represented by the formula $$\text{Polymer—Acrylate}_x \qquad \qquad \text{II}$$

wherein x is an integer of from 1 to about 5 and Polymer is an n valent polymeric material. Thus, a difunctional polymer, wherein x is 2, would have a structure represented by the formula $$\text{Acrylate—Polymer—Acrylate,} \qquad \qquad \text{III}$$

a t ifunctional polymer, wherein x is 3, would have the structure represented by the formula $$\text{Acrylate—Polymer—Acrylate,} \atop \text{Acrylate}$$

and so forth.

Thus, a polymer having monofunctional acrylates attached thereto would be represented by the formula

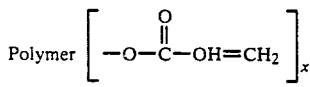

wherein polymer and x are as defined above. A polymer having polyfunctional acrylates attached thereto would be represented by the formula

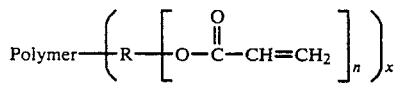

wherein Polymer, R, n, and x are as defined above.

Polymers having both monofunctional and polyfunctional acrylate groups attached thereto are also useful in the practice of the present invention. These types of acrylate modified polymers are represented by the structural formula

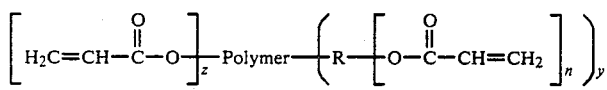

wherein Polymer, R, and n are as defined above, and y and z are integers having a value of from 1 to 3, provided that the sum of y+z does not exceed 5.

Exemplary typical acrylate modified polymers are acrylate polyesters represented by the formula

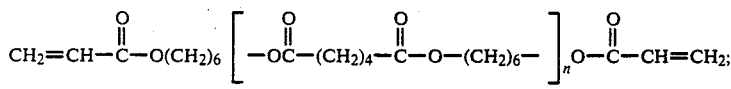

acrylate epoxies represented by the formula

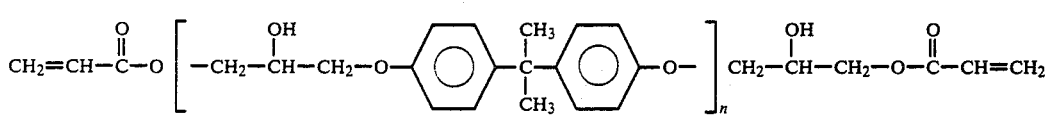

and acrylate urethanes represented by the formula

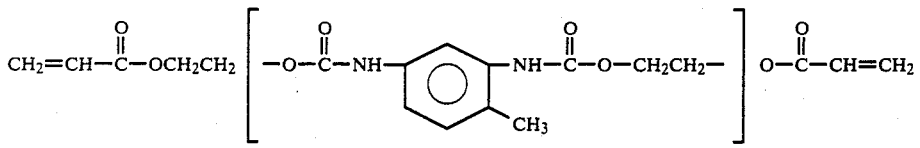

Acrylate modified polymers are the acrylate epoxies as described in U.S. Pat. No. 3,586,526, acrylate urethanes as described in U.S. Pat. No. 3,297,745, acrylate alkyd urethanes as described in U.S. Pat. No. 3,673,140, acrylate polycaprolactones as described in U.S. Pat. No. 3,700,643, acrylate unsaturated acid modified drying oils as described in U.S. Pat. No. 3,712,871, acrylate polyesters, and acrylate polyethers as described in U.S. 3,380,831, said references being incorporated herein by reference. Preferred acrylate modified polymers are the acrylated urethanes and acrylated polycaprolactones.

Generally, the coating compositions of the present invention contain a sufficient amount of monomer to give relatively free flowing solutions; however, a suitable organic solvent such as xylene, toluene, benzene and the like may optionally be incorporated in the coating compositions to lower the viscosity thereof. The coating compositions generally contain, in % by weight, from about 30% to about 90%, and preferably from about 40% to about 80% of said polyfunctional acrylate ester monomer, and from about 10% to about 70%, preferably from about 20% to about 60%, of the acrylate modified polymer.

The photocurable coating compositions also contain a photosensitizing amount of photosensitizer, i.e., an amount effective to effect the photocure of the coating composition. Generally, this amount is from about 0.01% to about 10% by weight, preferably from about 0.1% to about 5% by weight of the photocurable coating composition. These additives and the cure thereof are generally well known in the art. Some nonlimiting examples of these UV radiation photosensitizers include ketones, such as benzophenone, acetophenone, benzil, benzyl methyl ketone; benzoins and substituted benzoins such as benzoin methyl ether, α-hydroxymethyl benzoin isopropyl ether; halogen containing compounds such as α-bromoacetophenone, p-bromoacetophenone, α-chloromethylnaphthalene, and the like.

The coating compositions of the instant invention may also optionally contain various flatting agents, surface active agents, thixotropic agents, UV light absorbers and dyes. All of these additives and the use thereof are well known in the art and do not require extensive discussions. Therefore, only a limited number will be referred to, it being understood that any compounds possessing the ability to function in such a manner, i.e., as a flatting agent, surface active agent, UV light absorber, and the like, can be used so long as they do not deleteriously affect the photocuring of the coating compositions and do not adversely affect the non-opaque character of the coating.

The various surface-active agents, including anionic, cationic and nonionic surface-active agents are described in *Kirk-Othmer Encyclopedia of Chemical Technology,* Vol. 19, Interscience Publishers, New York, 1969, pp. 507–593, and *Encyclopedia of Polymer Science and Technology,* Vol. 13, Interscience Publishers, New York, 1970, pp. 477–486, both of which are references and incorporated herein.

The ultraviolet light absorbing compounds which can optionally be present in an amount effective to protect the polycarbonate substrate from the degradative effects of ultraviolet light, provided that they do not unduly interfere with or hinder the photocuring of the coating compositions. Some non-limiting examples of suitable ultraviolet light absorbing compounds are benzophenone derivatives such as 2,2'-dihydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone; and the like; and benzotriazole derivatives such as 2-(2'-hydroxy-5'-methylphenyl)-benzotriazole, 2-(2'-hydroxy-5'-tert-butylphenyl) benzotriazole, 2-(2'-hydroxy-3'-methyl-5'-tert-butylphenyl) benzotriazole, 2-(2'-hydroxyp-5'-cyclohexylphenyl)-benzotriazole, 2-(2'-hydroxy-3',5'-dimethylphenyl) benzotriazole, and the like.

In the practice of the present invention, the photocurable coating compositions are first compounded by adding together the polyfunctional acrylic monomer, the polymerizable acrylate modified polymer, the UV photosensitizer, and, optionally, any of the other aforementioned additives. Additionally, if so desired to reduce the viscosity of the coating formulation, an organic solvent may be incorporated into the formulation. Generally, the amount of solvent, if any, present should be such that evaporation of the solvent occurs before any deleterious effect on the substrate due to the aggressiveness (in the chemical etching sense) of the coating compositions develops. The various components are thoroughly mixed so as to form a generally homogeneous coating composition. A thin, uniform film of the coating solution is then applied onto the polycarbonate surface by any of the known means such as dipping, spraying, roll-coating and the like. Generally, the coating composition is applied in an amount sufficient to provide a cured coating of from about 0.1 mil to about 0.5 mil, preferably from about 0.2 mil to about 0.3 mil thick. The coating is then cured in an inert, e.g., nitrogen, atmosphere, by UV irradiation which can have a wavelength of from 1849 A. to 4000 A. The lamp systems used to generate such radiation can consist of ultraviolet lamps which can consist of discharge lamps, as for example, xenon, metallic halide, metallic arc, such as low or high pressure mercury vapor discharge lamps, etc., having generating pressure of from as low as a few milli- torr up to about 10 atmospheres, can be employed. After UV curing, there is present on the surface of the polycarbonate article a hard, nontacky, non-opaque, mar, abrasion and chemical resistant coating which is tenaciously adhered to the polycarbonate. The coating is comprised of the photoreaction product of the polyfunctional acrylate ester monomer and the acrylate modified polymer.

Upon the application of UV light, the composition is cured by the polymerization of the further polymerizable acrylate modified polymer. These polymers further polymerize through the olefinic unsaturation of the acrylate groups. Besides further chain growth of the acrylate modified polymers, crosslinking of these polymers occurs through the olefinic unsaturation of the acrylate groups. The polyfunctional acrylate ester monomers, besides serving as crosslinking agents for the acrylate modified polymers, also form polymers with each other, which polymers can in turn crosslink with each other or with the acrylate modified polymers.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein.

EXAMPLE 1

An aromatic polycarbonate is prepared by reacting 2,2-bis(4-hydroxyphenyl) propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in. thick. The test panels are subjected to an abrasion test and an adhesion test.

The abrasion test is one wherein test panels having a ¼ inch diameter hole cut in the center are subjected to a Taber Abraser. The Taber Abraser is equipped with CS-10F wheels which are resurfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardner Hazemeter. The sample is abraded for 100 cycles, cleaned with isopropanol, and the % Haze is remeasured at the same four places. The four differences in % Haze are calculated and averaged to give the %ΔHaze.

The adhesion test consists of using a multiple blade tool to cut parallel grooves through the coating into the substrate, the sample is then rotated 90° and the cutting process is repeated. This leaves a grid pattern of 1 mm squares cut into the coating. An adhesive tape is applied over the cross-hatched area and quickly pulled off. A sample fails the adhesion test if any of the squares are pulled off.

EXAMPLE 2

An acrylated urethane resin—acrylate monomer composition is made as follows. To a dry 1 liter flask equipped with a stirrer, reflux condenser and addition funnel 174.2 parts by weight of tolylene diisocyanate and 416.6 parts by weight of hexanediol diacrylate are added. The flask is heated to 50° C. employing a nitrogen sparge. To a mixture of 33.6 parts by weight of pentaerythritol triacrylate and 208.8 parts by weight of 2-hydroxyethyl acrylate is added 0.04 parts by weight of phenothiazine. The pentaerythritol triacrylate/hydroxyethyl acrylate/phenothiazine mixture is added from the addition funnel to the stirred mixture of tolylene diisocyanate in hexanediol diacrylate over a two hour period. The mixture is then heated at 60° C. with stirring for three hours. After this time, the resulting reaction product is allowed to cool to room temperature and 4.2 parts by weight of the pentaerythritol triacrylate-hydroxyethyl acrylate-phenothiazine is added to the product to react with any unreacted isocyanate.

EXAMPLE 3

A coating composition is prepared by blending 100 parts by weight of the acrylated urethane resin-acrylate monomer composition prepared in Example 2 with 2 parts by weight of α,α-diethoxy acetophenone, and 0.5 parts by weight of a surface active agent BYK-300 produced by Mallinckrodt Chemical Company. A film approximately 0.3 mils thick of this coating composition is applied to a polycarbonate panel prepared in accordance with Example 1 using a wire bound drawdown bar. The film is cured bypassing the coated panel twice through a Linde UV Curing Apparatus at approximately 50 feet/min. The UV Curing Apparatus consists essentially of a nitrogen blanketed conveyor containing germicidal and medium pressure mercury vapor lamps which emit light mainly at 2537 A°, 3150 A° and 3654 A°. The film is tack-free, cured, abrasion and solvent resistant after this treatment. The coated polycarbonate panel i- subjected to the Taber Abrasion Test and to the Adhesion Test and the results are set forth in Table II.

EXAMPLE 4

An acrylated urethane resin-acrylate monomer composition is made as follows. To a dry liter flask equipped with a stirrer, reflux condenser and addition funnel are added 174.2 parts by weight of tolylene diisocyanate and 416.6 parts by weight of neopentalglycol diacrylate. The flask is heated to 50° C. employing a nitrogen sparge. To a mixture of 33.6 parts by weight of pentaerythritol triacrylate and 208.8 parts by weight of 2-hydroxyethyl acrylate is added 0.04 parts by weight of phenathiazine. The pentaerythritol triacrylate-hydroxyethyl acrylate-phenothiazine mixture is added from the addition funnel to the stirred mixture of tolylene diisocyanate in neopentalglycol diacrylate over a two hour period. The resulting mixture is then heated at 60° C. with stirring for three hours. After this time, the resulting reaction product is allowed to cool to room temperature and 4.2 parts by weight of the pentaerythritol triacrylate-hydroxyethyl acrylatephenothiazine is added to the product to react with any unreacted isocyanate.

EXAMPLE 5

A coating composition is prepared by blending 100 parts by weight of the acrylated urethane resin-acrylate monomer composition prepared in Example 2 with 2 parts by weight of α,α-diethoxy acetophenone and 0.5 parts by weight of BYK-300. A film approximately 0.3 mils thick of this coating composition is applied to a polycarbonate panel prepared in accordance with Example 1 using a wire wound drawdown bar. The film is cured by passing the coated panel twice through a Linde UV Curing Apparatus at approximately 50 feet/min. The film is tack free, cured, abrasion and solvent resistant after this treatment. The coated polycarbonate panel is subjected to the Taber Abrasion Test and to the Adhesion Test and the results are set forth in Table II.

EXAMPLE 6

An acrylated urethane resin-acrylate monomer composition is made as follows. To a dry 1 liter flask equipped with a stirrer, reflux condenser and addition funnel 174.2 parts by weight of tolylene diisocyanate and 416.6 parts by weight of trimethylolpropane triacrylate are added. The flask is heated to 50° C. employing a nitrogen sparge. To a mixture of 33.6 parts by weight of pentaerythritol triacrylate and 208.8 parts by weight of 2-hydroxy ethyl acrylate is added 0.04 parts by weight of phenothiazine. The pentaerythritol triacrylate-hydroxy ethyl acrylate-phenothiazine mixture is added from the addition funnel to the stirred mixture of tolylene diisocyanate in trimethylolpropane triacrylate over a two hour period. The mixture is then heated at 60° C. with stirring for three hours. After this time, the resulting reaction product is allowed to cool to room temperature and 4.2 parts by weight of the pentaerythritol-hydroxyethyl acrylate-phenothiazine is added to the product to react with any unreacted isocycnate.

EXAMPLE 7

A coating composition is prepared by blending 100 parts by weight of the acrylated urethane resin-acrylate monomer composition prepared in Example 6 with 2 parts by weight of α,α-diethoxy acetophenone and 0.5 parts by weight of BYK-300. A film approximately 0.3 mils thick of this coating composition is applied to a polycarbonate panel prepared in accordance with Example 1 using a wire wound drawndown bar. The film is cured by passing the coated panel twice through a Linde UV Curing Apparatus at approximately 50 feet/min. The film is tack free, cured, abrasion and solvent resistant after this treatment. The coated polycarbonate panel is subjected to the Taber Abrasion Test and to the Adhesion Test and the results are set forth in Table II.

EXAMPLE 8

An acrylated urethane resin is made by reacting 41.6 parts by weight of a polycaprolactone with 55.6 parts by weight of isophorone diisocyanate in 54 parts by weight of 1,6-hexanediol diacrylate for 8 hours at room temperature and then with 36.4 parts by weight of hydroxyethylacrylate for 11 hours at 70° C. A blend is made containing 40 parts by weight of the acrylated urethane resin, 43 parts by weight of neopentylglycol diacrylate, 17 parts by weight of 1,6-hexanediol diacrylate, 2 parts by weight of α,α-diethoxyacetophenone, and 0.5 parts by weight of BYK-300. A film approximately 0.3 mil thick is applied to a polycarbonate panel made substantially in accordance with Example 1. The film is applied, cured and tested as set forth in Example 3 and the results are set forth in Table II.

EXAMPLE 9

A blend was made of 40 parts by weight of Actomer X-80 (an acrylated epoxidized linseed oil) produced by Union Carbide Corp. of New York, N.Y., 60 parts by weight neopentylglycol diacrylate, 2 parts by weight α,α-diethoxyacetophenone, and 0.5 parts by weight of BYK-300. A film of this blend is applied to a polycarbonate, cured and tested as in Example 3 and the results are set forth in Table II.

EXAMPLE 10

A blend is made of 40 parts by weight of Dow XD 8008-04 (an acrylated bisphenol-A diglycidyl ether) produced by Dow Chemical Co., of Midland, Michigan, 60 parts by weight of neopentyl glycol diacrylate, 2 parts by weight of α,α-diethoxyacetophenone, and 0.05 parts by weight of BYK-300. A film of this blend is applied to a polycarbonate, cured and tested as in Example 3 and the results are set forth in Table II.

TABLE II

| Example No. | Abrasion (Δ% Haze) | Adhesion |
|---|---|---|
| 1 (no coating) | 34.0 | — |
| 3 | 3.5 | Pass |
| 5 | 4.3 | Pass |
| 7 | 3.6 | Pass |
| 9 | 17.2 | Fail |
| 10 | 15.9 | Fail |

EXAMPLES 11–12

A number of blends are made which are generally similar to Example 2 except the acrylic monomers are varied. Films of these blends are made and applied to polycarbonate panels and cured substantially in accordance with Example 3. The results are set forth in Table III.

TABLE III

| Example No. | Monomer | Results |
|---|---|---|
| 11 | Ethylene diacrylate | Film wrinkled |
| 12 | Tetraethylene glycol diacrylate | Film wrinkled |

The following are examples of combinations which produce unsatisfactory coatings, i.e., coatings which are inoperative in the present invention.

EXAMPLES 13–16

A number of blends are made which are generally similar to Example 2 except the acrylic monomers are varied. Films of these blends are made and applied to polycarbonate panels and cured substantially in accordance with Example 3. The results are set forth in Table IV.

TABLE IV

| Example No. | Monomer | Results |
|---|---|---|
| 13 | Hydroxyethyl acrylate | Unsatisfactory (too wrinkled) |
| 14 | Ethoxyethyl acrylate | Unsatisfactory (too wrinkled) |
| 15 | Ethylene dimethyacrylate | Unsatisfactory (wrinkled and tacky) |
| 16 | 1,3-butylene dimethacrylate | Unsatisfactory (wrinkled and tacky) |

As can be seen from the foregoing Examples and Tables II–IV, only certain combinations of the acrylated resins of this invention and certain polyfunctional acrylate monomers give acceptable results. Thus, satisfactory results are obtained by using a combination of the acrylated urethane resin of this invention in combination with neopentylglycol diacrylate, trimethylolpropane triacrylate, hexanediol diacrylate, or butyleneglycol diacrylate. Unsatisfactory results are obtained using an acrylated bisphenol-A diglycidyl ether and a neopentyl glycol diacrylate; an acrylated epoxidized linseed oil and neopentyl glycol diacrylate; and an acrylated urethane in combination with ethylene diacrylate, or tetraethylene glycol diacrylate. As shown in Table IV, combinations of acrylated urethane resins with ethylene dimethacrylate or butylene dimethacrylate or with monofunctional acrylates are inoperative in the practice of the present invention.

It is apparent from this that not all combinations of resin and monomers give films which cure readily on polycarbonates to give smooth films which have good abrasion resistance and adhesion to the polycarbonate. Certain combinations of acrylated resins with polyfunctional acrylate monomers give better results than others, while the methacrylate monomers and monofunctional acrylate monomers are unsuitable in forming the coatings of the present invention. In fact, there appears to be no way in which one may predict from the starting blend that this set of optimum properties will be obtained.

From the foregoing Examples, it is clear that a combination of an acrylated urethane resin as described in Example 2 with a 1,3-butylene diacrylate monomer, 1,6-hexanediol diacrylate monomer, neopentylglycol diacrylate, and trimethylolpropane triacrylate monomer results in a coating composition which upon curing gives a coating having excellent properties, i.e., a coating comprising the photoreaction product of an acrylated urethane and a polyfunctional acrylate monomer selected from the group consisting of neopentylglycol diacrylate, 1,3-butylene diacrylate, 1,6-hexanediol diacrylate, and trimethylolpropane triacrylate, gives excellent results.

What is claimed is:

1. A coated polycarbonate article comprised of a polycarbonate substrate having disposed on at least one surface thereof an ultraviolet radiation curable coating composition consisting essentially of the following essential components: (i) at least one acrylic modified polymer; (ii) at least one polyfunctional acrylic acid ester monomer represented by the general formula

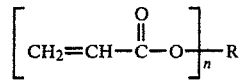

wherein n is an integer having a value of from 2 to 4 inclusive, and R is selected from n valent aliphatic hydrocarbon residues, n valent substituted aliphatic hydrocarbon residues, n valent aliphatic hydrocarbon residues containing at least one ether linkage, and n valent substituted aliphatic hydrocarbon residues containing at least one ether linkage; and (iii) a photoinitiator.

2. The article of claim 1 wherein said acrylate modified polymer is selected from the acrylated polyurethanes.

3. The article of claim 2 wherein said polyfunctional acrylic acid ester monomer is selected from the group consisting of neopentylglycol diacrylate, trimethylol propane triacrylate, hexanediol diacrylate, 1,3-butylene diacrylate, and mixtures thereof.

4. The article of claim 3 wherein said photoinitiator is present in an amount effective to initiate the photocuring of said coating composition.

5. A coated polycarbonate article comprised of a polycarbonate substrate having disposed on at least one surface thereof an ultraviolet radiation cured coating consisting essential of the photoreaction products of the following essential components: (i) at least one acrylate modified polymer; and (ii) at least one polyfunctional acrylic acid ester monomer represented by the general formula

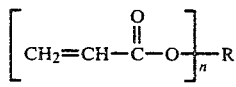

wherein n is an integer having a value of from 2 to 4 inclusive, and R is selected from a n valent aliphatic hydrocarbon residue, n valent substituted aliphatic hydrocarbon residue, n valent aliphatic hydrocarbon residue containing at least one ether linkage, and n valent substituted aliphatic hydrocarbon residue containing at least one ether linkage.

6. The article of claim 5 wherein said acrylate modified polymer is selected from the acrylated polyurethanes.

7. The article of claim 6 wherein said polyfunctional acrylic acid ester monomer is selected from the group consisting of neopentylglycol diacrylate, trimethylol propane triacrylate, hexanediol diacrylate, 1,3-butylene diacrylate, and mixtures thereof.

* * * * *